(12) United States Patent
Iwata et al.

(10) Patent No.: US 11,370,238 B2
(45) Date of Patent: Jun. 28, 2022

(54) RECORDING APPARATUS

(71) Applicant: SEIKO EPSON CORPORATION, Tokyo (JP)

(72) Inventors: Morio Iwata, Matsumoto (JP); Satoshi Yoshino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 39 days.

(21) Appl. No.: 17/103,071

(22) Filed: Nov. 24, 2020

(65) Prior Publication Data
US 2021/0155021 A1  May 27, 2021

(30) Foreign Application Priority Data

Nov. 27, 2019 (JP) .............................. JP2019-214365

(51) Int. Cl.
*B41J 13/10* (2006.01)
*B65H 31/02* (2006.01)
*F16H 19/04* (2006.01)

(52) U.S. Cl.
CPC ............ *B41J 13/106* (2013.01); *B65H 31/02* (2013.01); *F16H 19/04* (2013.01); *B65H 2403/41* (2013.01); *B65H 2405/11* (2013.01); *B65H 2405/1122* (2013.01); *B65H 2405/11164* (2013.01)

(58) Field of Classification Search
CPC ................................................ B65H 2405/11
See application file for complete search history.

(56) References Cited

U.S. PATENT DOCUMENTS

| 2012/0223470 | A1* | 9/2012 | Soga | B65H 31/02 |
| | | | | 270/58.11 |
| 2013/0313772 | A1* | 11/2013 | Kuo | B65H 31/02 |
| | | | | 271/223 |
| 2013/0341853 | A1* | 12/2013 | Hsu | B65H 1/266 |
| | | | | 271/145 |
| 2018/0029393 | A1 | 2/2018 | Matsumoto | |
| 2018/0272763 | A1 | 9/2018 | Yoshino et al. | |

FOREIGN PATENT DOCUMENTS

| JP | 6218897 B | 10/2017 |
| JP | 2018-158835 A | 10/2018 |

* cited by examiner

*Primary Examiner* — Jennifer Bahls
(74) *Attorney, Agent, or Firm* — Workman Nydegger

(57) ABSTRACT

A recording apparatus includes: an apparatus main body that includes a recording unit; a medium-receiving tray that is configured to be switched between a first state and a second state; and a motor, in which the medium-receiving tray includes a first tray, a second tray that is configured to be displaced with respect to the first tray and that is positioned further than the first tray from the apparatus main body when the medium-receiving tray is in the second state, a pinion gear engaged with a first rack formed in the first tray in a displacement direction of the second tray and with a second rack formed in the second tray in the displacement direction, and a displacement section that supports the pinion gear and that is displaced in the displacement direction in response to receiving power from the motor.

14 Claims, 18 Drawing Sheets

FIG. 1
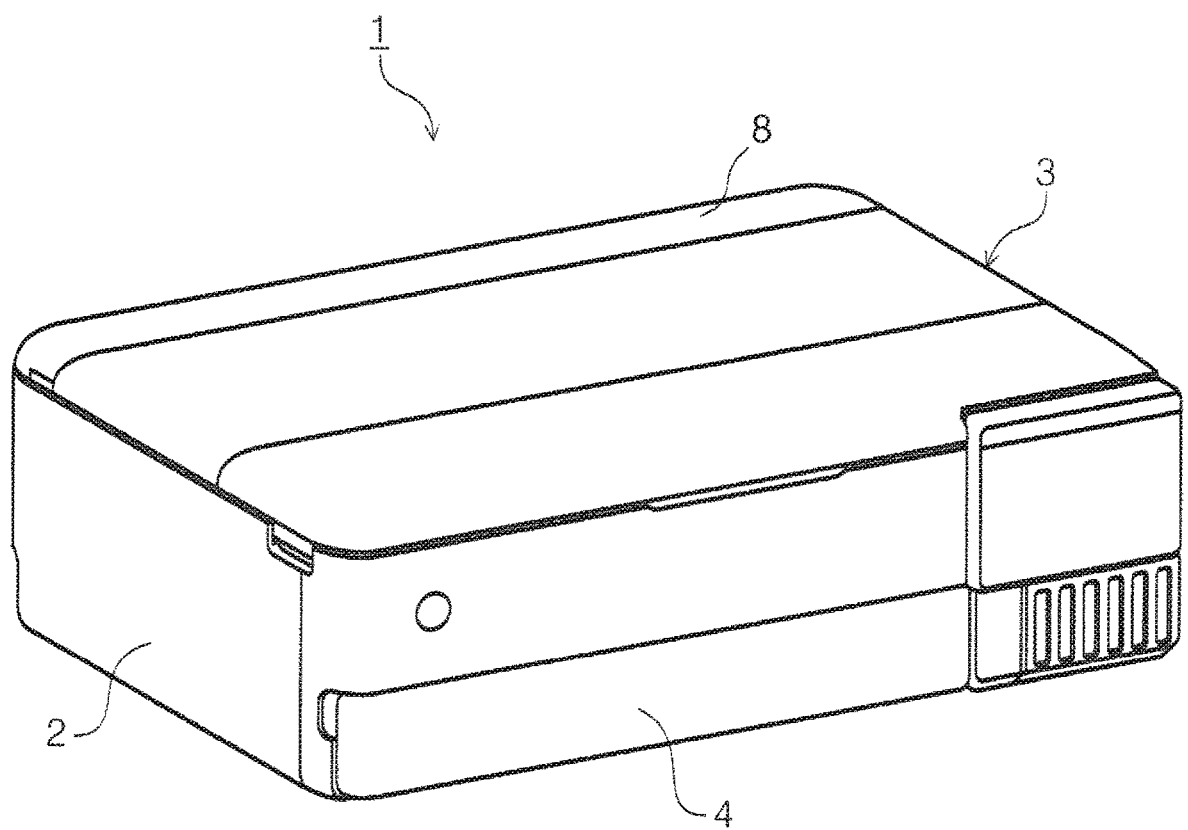
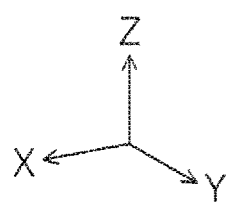

RECORDING APPARATUS

The present application is based on, and claims priority from JP Application Serial Number 2019-214365, filed Nov. 27, 2019, the disclosure of which is hereby incorporated by reference herein in its entirety.

BACKGROUND

1. Technical Field

The present disclosure relates to a recording apparatus that performs recording on a medium.

2. Related Art

Some recording apparatuses such as facsimile devices and printers include a medium-receiving tray that receives a medium discharged after recording is performed. Such a medium-receiving tray is constituted by a plurality of trays and is configured to enable switching between an accommodated state and an extended state by using a motor. A medium-receiving tray described in JP-A-2018-158835 is constituted by a first tray and a second tray that is positioned further than the first tray in a medium discharging direction when the medium-receiving tray is in the extended state. A gear is engaged with a rack that is formed on a side surface of each of the trays and a rack-and-pinion mechanism is formed, and the trays are thereby driven.

In a configuration in which the medium-receiving tray is brought into the extended state by using the rack-and-pinion mechanism as described in JP-A-2018-158835, when each of the trays is further increased in length in the medium discharging direction to receive a longer medium, displacement time of the tray is increased in accordance with the increase in the length, and therefore, the medium-receiving tray requires time to be brought into the extended state.

SUMMARY

To solve the aforementioned problem, a recording apparatus of the disclosure includes: an apparatus main body that includes a recording unit that performs recording on a medium; a medium-receiving tray that is configured to be switched between a first state in which the medium-receiving tray is accommodated in the apparatus main body and a second state in which the medium-receiving tray is maximally projected from the apparatus main body and that receives the medium which is discharged when the medium-receiving tray is in the second state or is in a state of being projected from the apparatus main body while the state is switched from the first state to the second state; and a motor that is a power source for switching a state of the medium-receiving tray, in which the medium-receiving tray includes a first tray, a second tray that is configured to be displaced with respect to the first tray and that is positioned further than the first tray from the apparatus main body when the medium-receiving tray is in the second state, a pinion gear engaged with a first rack formed in the first tray in a displacement direction of the second tray and with a second rack formed in the second tray in the displacement direction, and a displacement section that supports the pinion gear and that is displaced in the displacement direction in response to receiving power from the motor.

BRIEF DESCRIPTION OF THE DRAWINGS

FIG. 1 is a perspective view of a printer in which a medium-receiving tray is in an accommodated state.

DESCRIPTION OF EXEMPLARY EMBODIMENTS

Figure 2:
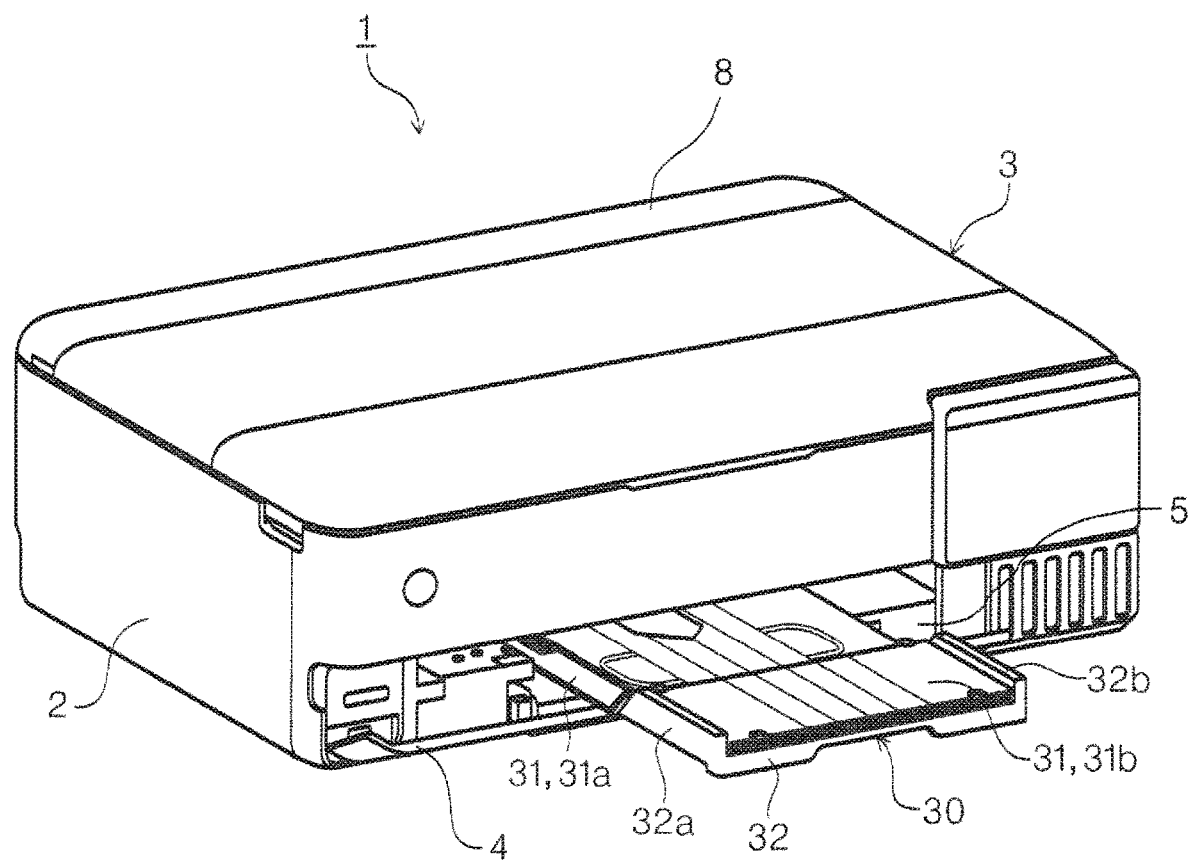
FIG. 2 is a perspective view of the printer in which the medium-receiving tray is in a first extended state.

The disclosure will be schematically described below.

A recording apparatus according to a first aspect includes: an apparatus main body that includes a recording unit that performs recording on a medium; a medium-receiving tray that is configured to be switched between a first state in which the medium-receiving tray is accommodated in the apparatus main body and a second state in which the medium-receiving tray is projected from a front surface of the apparatus main body and that receives the medium which is discharged; and a motor that is a power source for switching a state of the medium-receiving tray, in which the medium-receiving tray includes a first tray, a second tray that is configured to be displaced with respect to the first tray and that is positioned further than the first tray from the apparatus main body when the medium-receiving tray is in the second state, a pinion gear engaged with a first rack formed in the first tray in a displacement direction of the second tray and with a second rack formed in the second tray in the displacement direction, and a displacement section that supports the pinion gear and that is displaced in the displacement direction in response to receiving power from the motor.

According to the present aspect, a configuration is such that the pinion gear is interposed between the first tray and the second tray, the displacement section that supports the pinion gear is displaced, the pinion gear is thus displaced in the displacement direction while rotating, and rotation of the pinion gear at this time causes the second tray to be displaced. Accordingly, it is possible to increase a displacement amount of the second tray compared to a displacement amount of the displacement section. Such a configuration makes it possible to shorten the time to switch the medium-receiving tray from the first state to the second state or from the second state to the first state.

According to a second aspect, in the first aspect, the displacement section includes a rack forming section in which a third rack is formed in the displacement direction, and a gear support section that is positioned further than the rack forming section in a discharging direction of the medium and that supports the pinion gear, and the rack forming section is provided close to a side of the first tray in a width direction that is a direction intersecting the displacement direction.

According to the present aspect, the displacement section includes the rack forming section and the gear support section that is positioned further than the rack forming section in the discharging direction of the medium, and the rack forming section is provided close to the side of the first tray in the width direction that is the direction intersecting the displacement direction. Accordingly, it is possible to avoid an increase in thickness of a region of the first tray excluding the rack forming section in the width direction. As a result, a configuration that contributes to a reduction in the dimension of the apparatus main body in the height direction is able to be provided.

According to a third aspect, in the second aspect, the first tray includes a first portion, and a second portion that is positioned further than the first portion from the apparatus main body in the discharging direction of the medium and that is higher than the first portion, and a portion of the second tray and the gear support section are configured to be arranged in a space under the second portion.

According to the present aspect, the first tray includes the first portion and the second portion that is positioned further than the first portion from the apparatus main body in the discharging direction of the medium and that is higher than the first portion, and the second tray and the gear support section are arranged by using the space under the second portion. Accordingly, a dimension of the medium-receiving tray in a thickness direction is able to be reduced.

According to a fourth aspect, in the second or third aspect, the gear support section is formed into a tray shape and is held between the first tray and the second tray.

According to the present aspect, a configuration is such that the gear support section is formed into the tray shape and is held between the first tray and the second tray, and accordingly overall rigidity of the medium-receiving tray is able to be increased.

According to a fifth aspect, in any of the first to fourth aspects, the second tray and the displacement section are supported by the first tray.

According to the present aspect, a configuration is such that the second tray and the displacement section are supported by the first tray, and accordingly a whole of the medium-receiving tray is able to be assembled as an assembly, thus facilitating an apparatus assembling operation.

According to a sixth aspect, in any of the first to fifth aspects, the first tray is displaced in the displacement direction in response to receiving the power from the motor.

According to the present aspect, the first tray is displaced in the displacement direction in response to receiving the power from the motor, and accordingly the second tray is able to be projected further in the medium discharging direction.

According to a seventh aspect, in any of the first to sixth aspects, the pinion gear is a compound gear in which a first pinion gear section engaged with the first rack and a second pinion gear section engaged with the second rack are integrally formed, and the second pinion gear section is larger than the first pinion gear section in diameter and number of teeth.

According to the present aspect, a configuration is such that the pinion gear is the compound gear in which the first pinion gear section engaged with the first rack and the second pinion gear section engaged with the second rack are integrally formed, and the second pinion gear section is larger than the first pinion gear section in diameter and number of teeth. Accordingly, it is possible to further increase a projecting amount of the second tray relative to a rotational amount of the pinion gear. As a result, it is possible to further shorten the time to switch the medium-receiving tray from the first state to the second state or from the second state to the first state.

The disclosure will be specifically described below.

Note that, in the drawings, a direction extending along an X-axis is an apparatus width direction, which is a direction intersecting a sheet transport direction, in other words, a sheet width direction. From the view of a user facing the apparatus front surface, a −X direction is a rightward direction with respect to the user, and a +X direction is a leftward direction with respect to the user.

A direction extending along a Y-axis is an apparatus depth direction, a +Y direction is a direction extending from the apparatus rear surface to the apparatus front surface, and a −Y direction is a direction extending from the apparatus front surface to the apparatus rear surface. The Y-axis direction is a displacement direction of a medium-receiving tray 30 described later, and the +Y direction is an extending direction of the medium-receiving tray 30 and is also a discharging direction of a recording sheet. The −Y direction is an accommodating direction of the medium-receiving tray 30.

A direction extending along a Z-axis is a vertical direction, a +Z direction is a vertically upward direction, and a −Z direction is a vertically downward direction.

In the present embodiment, among side surfaces surrounding the apparatus, a side surface on which a front surface cover 4 is provided is the apparatus front surface.

In FIG. 1, an ink jet printer 1 that is an example of the recording apparatus is a so-called multifunctional peripheral that includes a scanner section 3 disposed on an apparatus main body 2. Hereinafter, the ink jet printer 1 is abbreviated as "printer 1".

Figure 4:
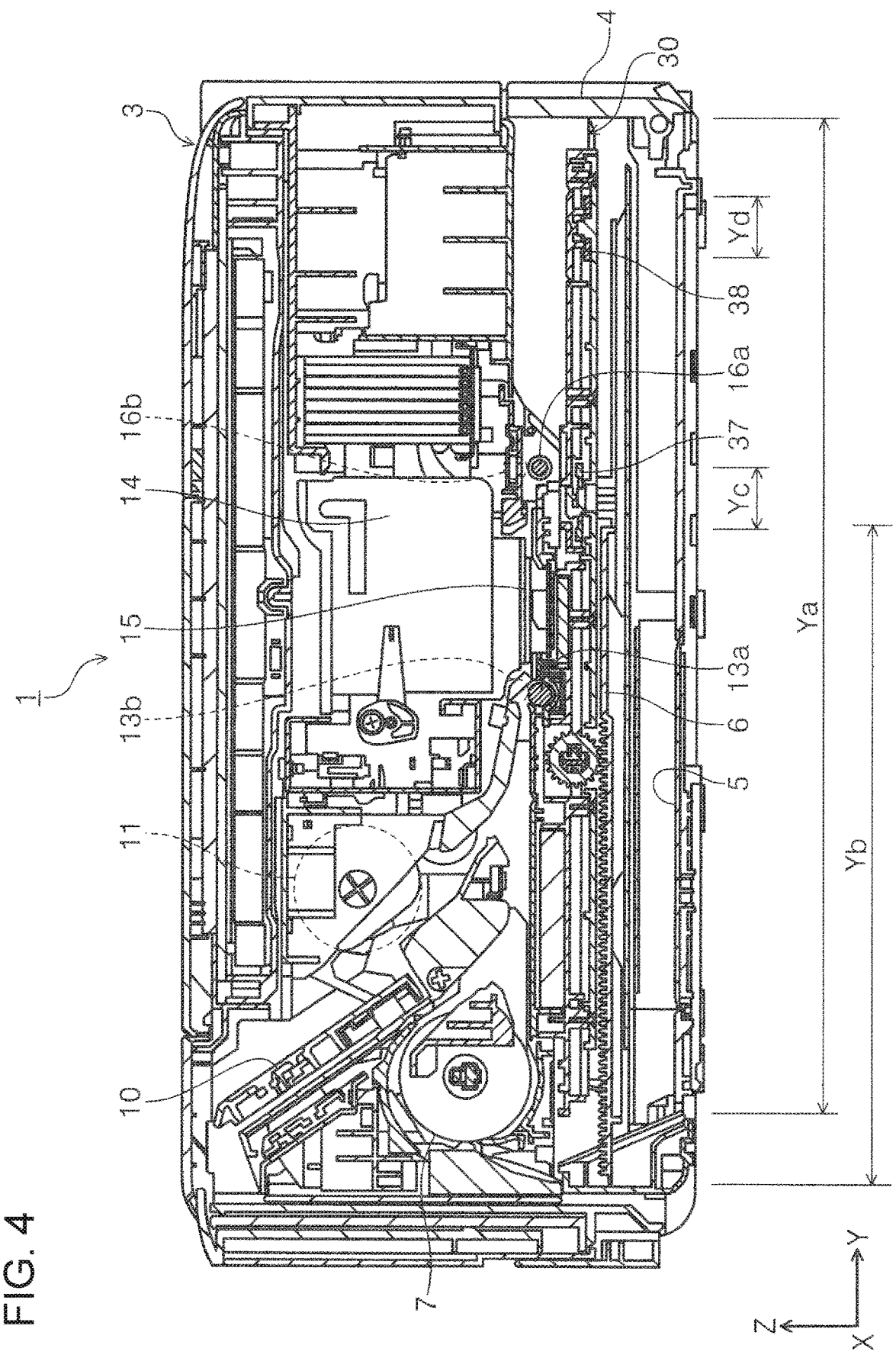
FIG. 4 is a sectional side view illustrating a sheet transport path of the printer

The apparatus main body 2 includes a transport path (described later) along which a recording sheet that is an example of the medium is transported and a recording head 15 (refer to FIG. 4) that is an example of the recording unit, and, in the present embodiment, further includes two sheet feeding trays, specifically, a lower sheet feeding tray 5 and an upper sheet feeding tray 6 as illustrated in FIG. 4. Note that the upper sheet feeding tray 6 is displaced in the Y-axis direction in response to receiving power from a motor (not illustrated). The lower sheet feeding tray 5 is configured to be detachably attachable to the apparatus main body 2.

The apparatus main body 2 is configured to enable sheets to be fed from the lower sheet feeding tray 5 and the upper sheet feeding tray 6 and additionally from the apparatus rear surface. Reference numeral 8 denotes a cover that opens and closes a sheet setting opening (not illustrated) used for setting a sheet from a side of the apparatus rear surface.

Figure 3:
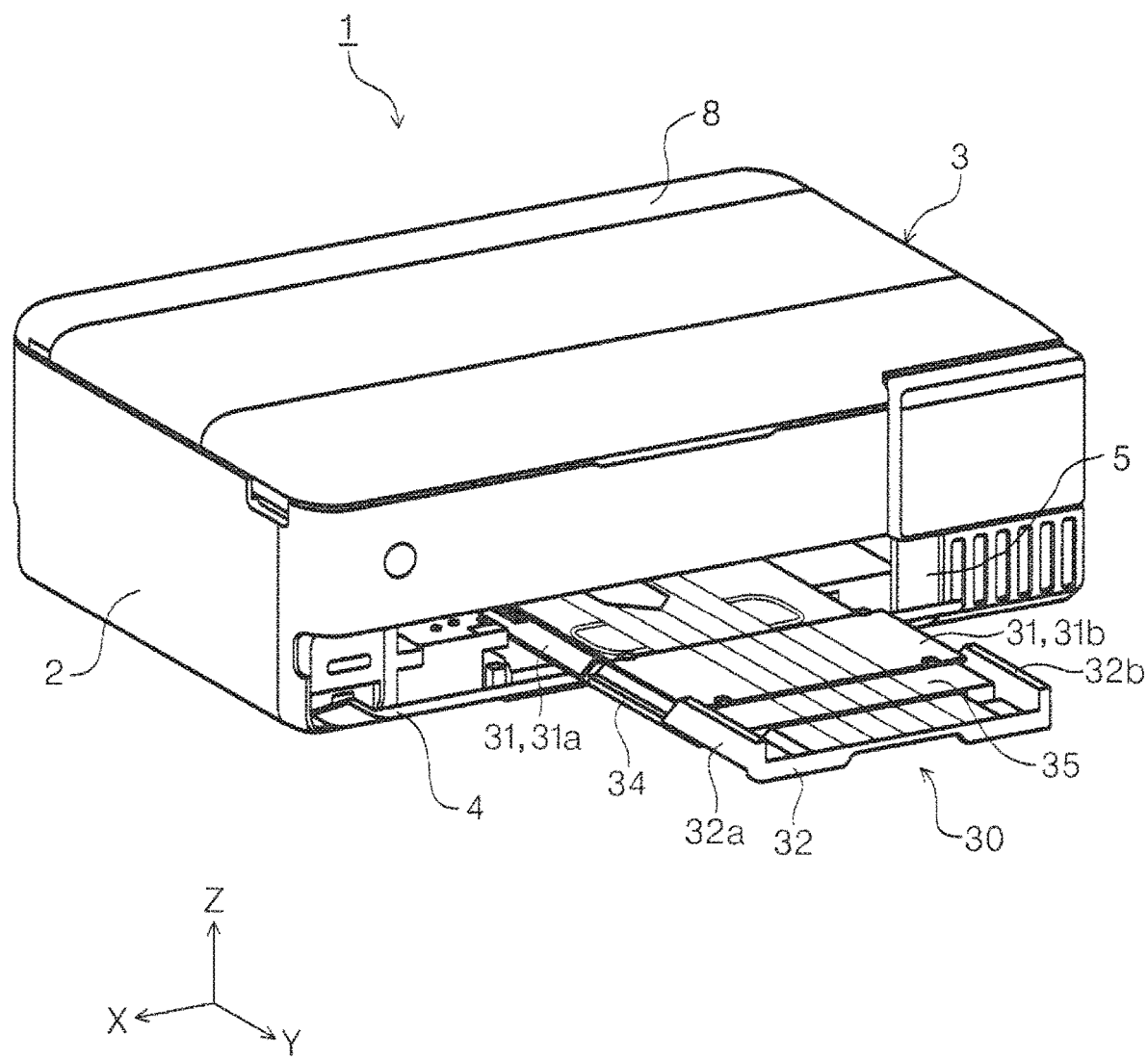
FIG. 3 is a perspective view of the printer in which the medium-receiving tray is in a second extended state.

On a lower side of the front surface of the apparatus main body 2, the front surface cover 4 is provided. The front surface cover 4 is rotatably provided with respect to the lower sheet feeding tray 5, and by rotating, can take a close state as illustrated in FIG. 1 and an open state as illustrated in FIGS. 2 and 3.

When the front surface cover 4 is opened, the medium-receiving tray 30 that receives a recording sheet discharged after recording is performed is exposed. By receiving power from a motor 41 (refer to FIG. 9) that is a drive source for switching a state, the medium-receiving tray 30 can take a state in which the medium-receiving tray 30 is accommodated inside the apparatus main body 2 as illustrated in FIG. 1 and a state in which the medium-receiving tray 30 is extended by being projected from the apparatus main body 2 as illustrated in FIGS. 2 and 3.

Note that the medium-receiving tray 30 will be specifically described later.

An inverting roller 7 is provided in the −Y direction in the apparatus main body 2 as illustrated in FIG. 4, and a recording sheet that is fed from the lower sheet feeding tray 5 or the upper sheet feeding tray 6 in the −Y direction is inverted by the inverting roller 7 and fed to a transport drive roller 13a and a transport driven roller 13b that are positioned in the +Y direction. Note that reference numeral 10 denotes an inclined support section that is exposed when an upper surface cover 8 is opened, and the recording sheet supported by the inclined support section 10 is fed by a feeding roller 11 to the transport drive roller 13a and the transport driven roller 13b.

The recording sheet is transported by the transport drive roller 13a and the transport driven roller 13b to a region facing the recording head 15, that is, a recording region.

The recording head 15 is provided in a carriage 14, and the carriage 14 is reciprocated in the X-axis direction by a power source (not illustrated). In response to a moving operation of the carriage 14, the recording head 15 ejects ink onto the recording sheet.

The recording sheet subjected to the recording is discharged by a discharge drive roller 16a and a discharge driven roller 16b to the medium-receiving tray 30.

Next, the medium-receiving tray 30 will be specifically described.

The medium-receiving tray 30 as the medium-receiving tray is able to be switched between an accommodated state (refer to FIG. 1) in which the medium-receiving tray 30 is accommodated in the apparatus main body 2 and an extended state (refer to FIGS. 2 and 3) in which the medium-receiving tray 30 is projected from the apparatus main body 2 in the +Y direction. The extended state includes a first extended state (refer to FIG. 2) and a second extended state (refer to FIG. 3) in which the medium-receiving tray 30 is projected further in the +Y direction than in the first extended state. The second extended state is a state in which the medium-receiving tray 30 is maximally projected from the apparatus main body 2.

The accommodated state is an example of the first state of the medium-receiving tray 30 and the second extended state is an example of the second state of the medium-receiving tray 30.

Figure 6:
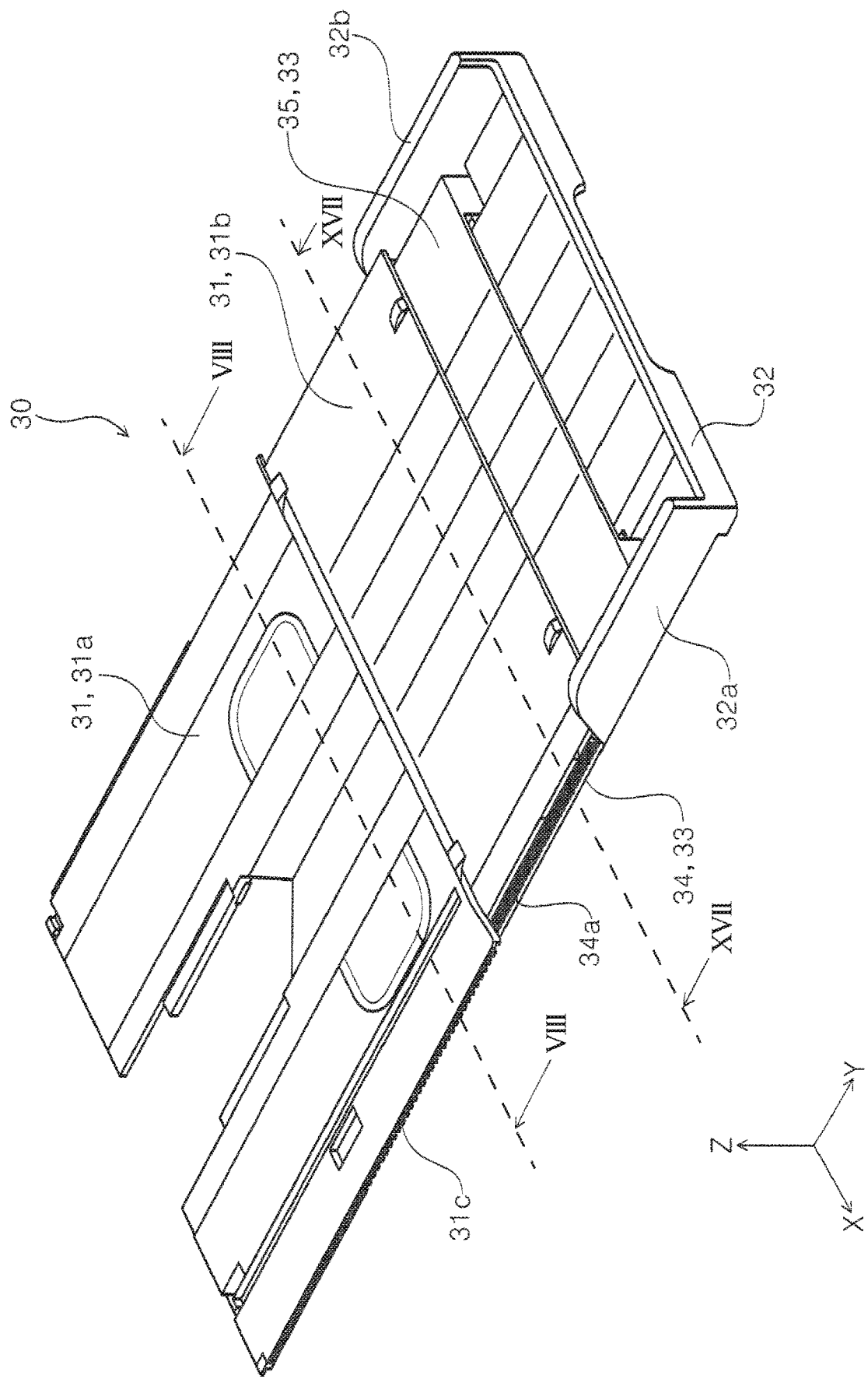
FIG. 6 is a perspective view of the medium-receiving tray in the second extended state.

As illustrated in FIG. 6, the medium-receiving tray 30 includes a first tray 31 and a second tray 32 that is displaceable with respect to the first tray 31 and that is positioned further than the first tray 31 from the apparatus main body 2 when the medium-receiving tray 30 is in the second extended state.

The first tray 31 is provided to be slidable with respect to a frame (not illustrated) that constitutes the apparatus main body 2, and the second tray 32 is provided to be slidable with respect to the first tray 31 via a gear support section 35 that constitutes a displacement section 33.

Figure 7:
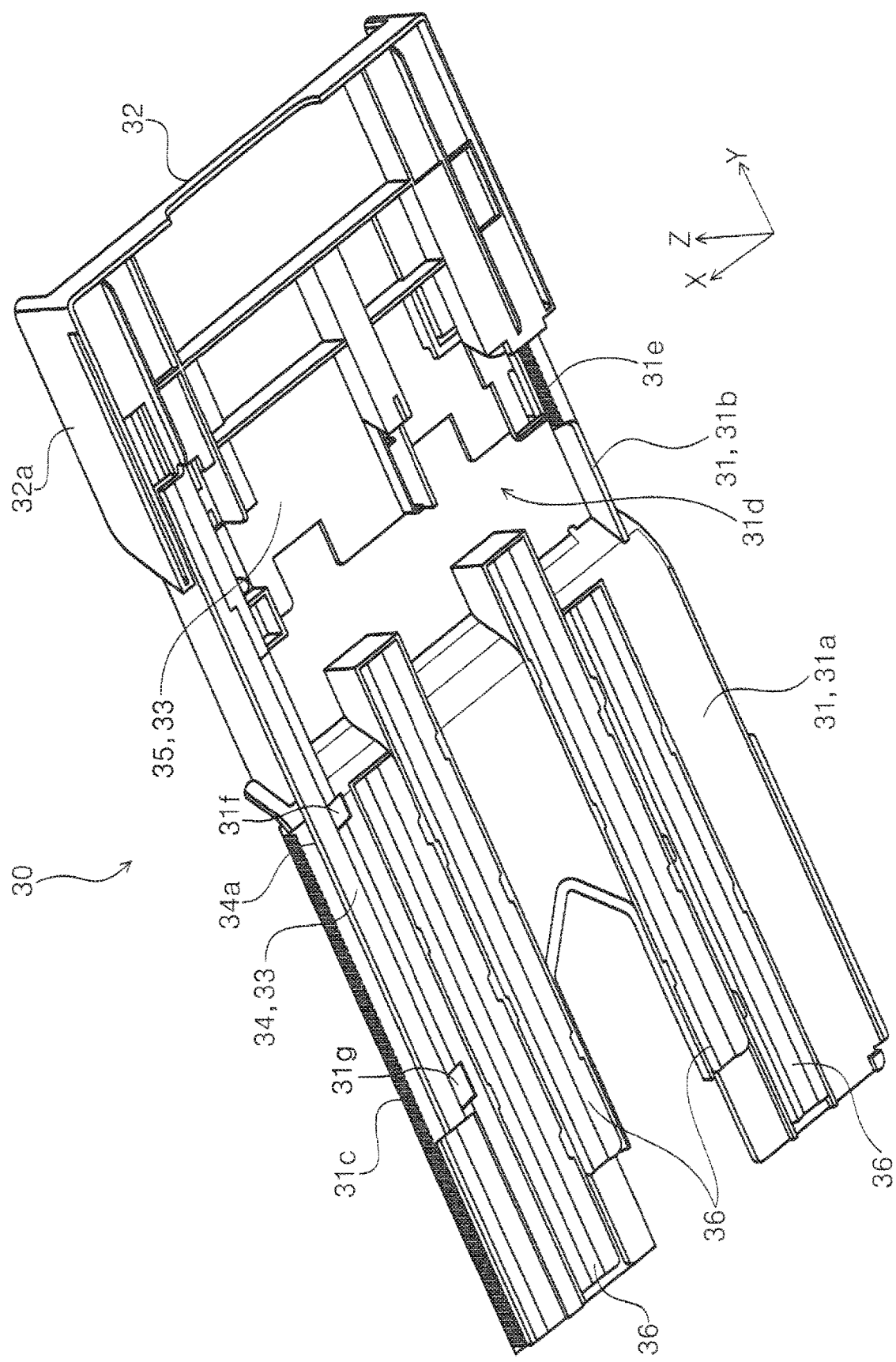
FIG. 7 is a perspective view of the medium-receiving tray in the second extended state as viewed from a rear side.

As illustrated in FIG. 7, the displacement section 33 is constituted by a rack forming section 34 and the gear support section 35 that is positioned in the +Y direction with respect to the rack forming section 34. The gear support section 35 is fixed to a fixing section 34b, which is formed in the rack forming section 34 as illustrated in FIG. 13, by using a screw 49 as illustrated in FIG. 9.

Figure 9:
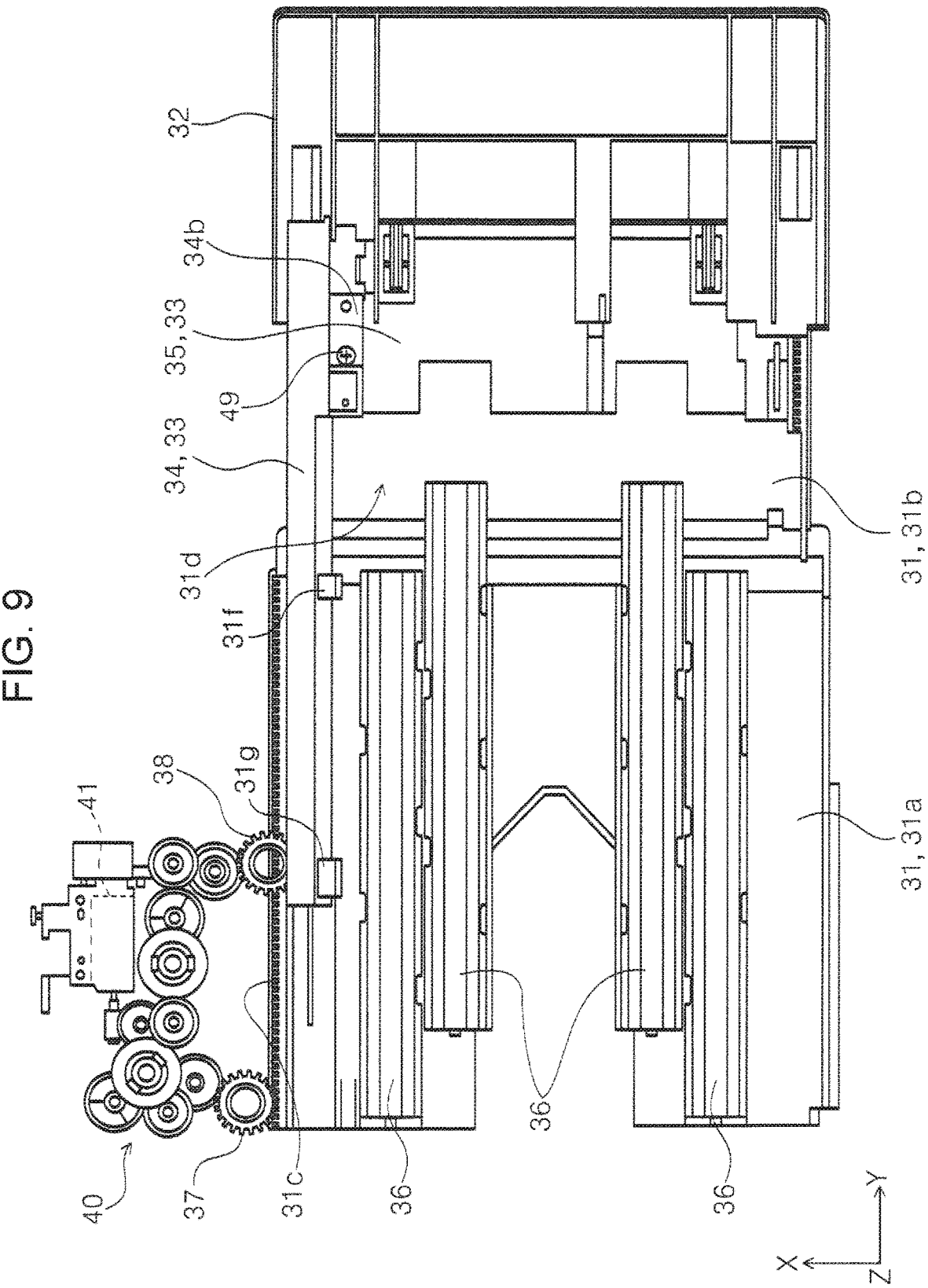
FIG. 9 is a plan view of the medium-receiving tray in the second extended state and a transmission gear group as viewed from the rear side.
Figure 10:
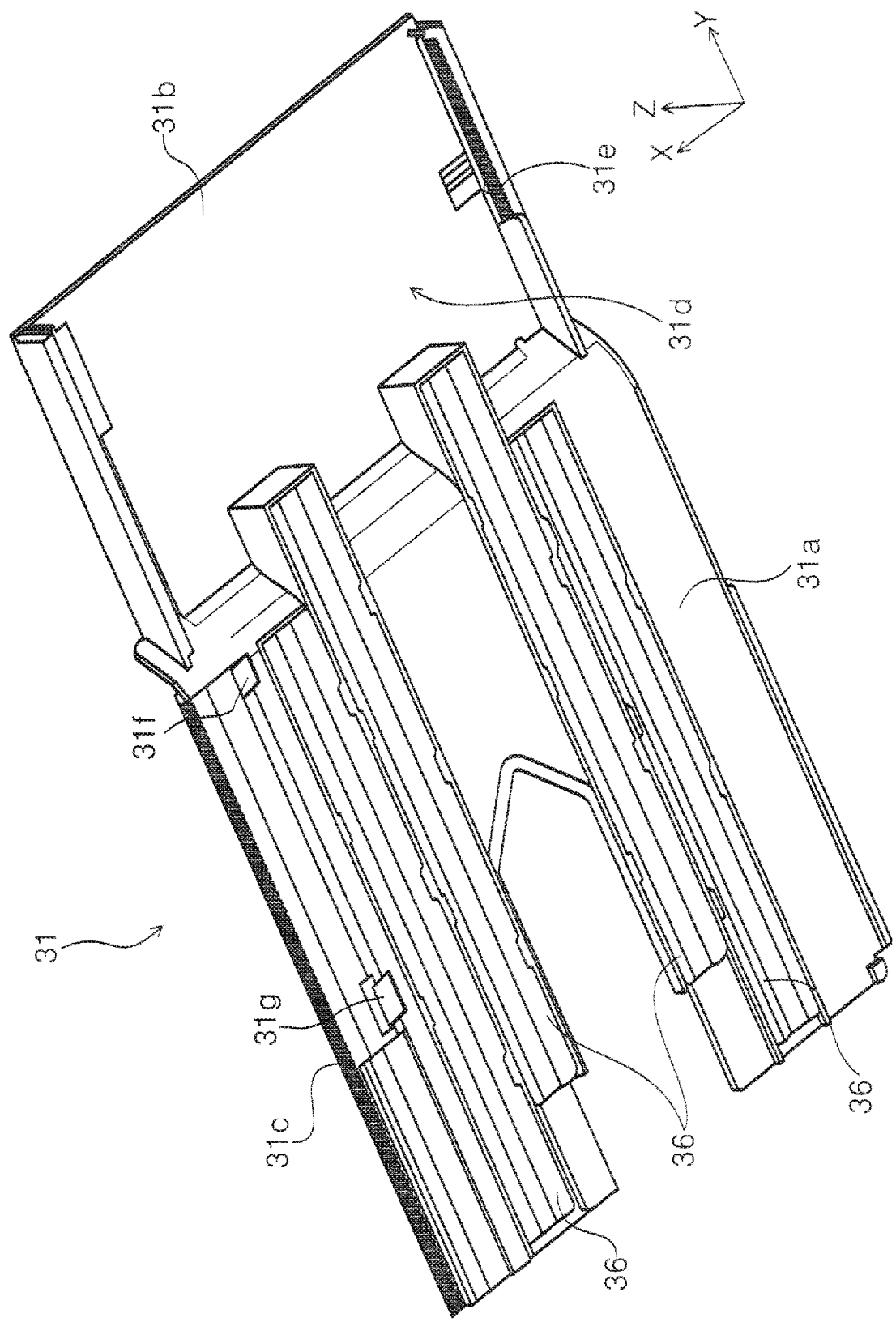
FIG. 10 is a perspective view of a first tray as viewed from a lower side.

Support sections 31f and 31g are formed with a space therebetween in the Y-axis direction in the first tray 31 as illustrated in FIGS. 7, 9, and 10, and the rack forming section 34 that constitutes the displacement section 33 is supported by the support sections 31f and 31g.

Figure 17:
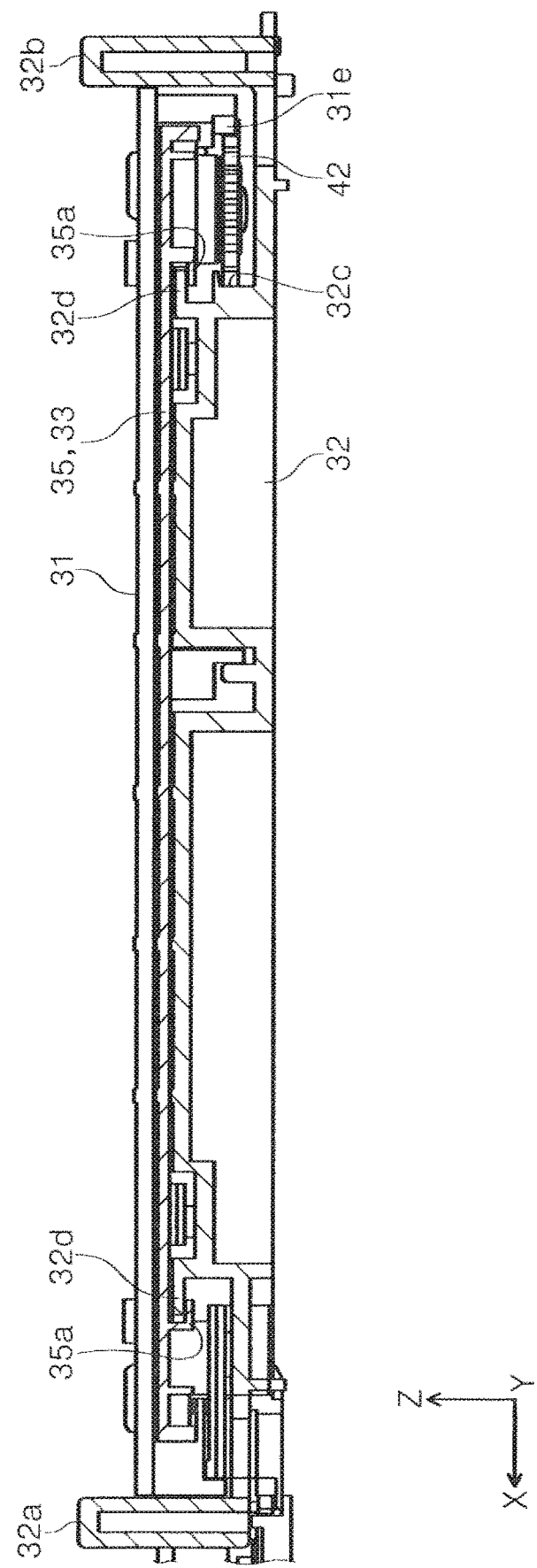
FIG. 17 is a sectional view taken along a line XVII-XVII in FIG. 6.

In the gear support section 35 that constitutes the displacement section 33, support sections 35a and 35a are formed with a space therebetween in the X-axis direction as illustrated in FIG. 17, and supported sections 32d and 32d that are formed in the second tray 32 are supported by the support sections 35a and 35a.

Figure 13:
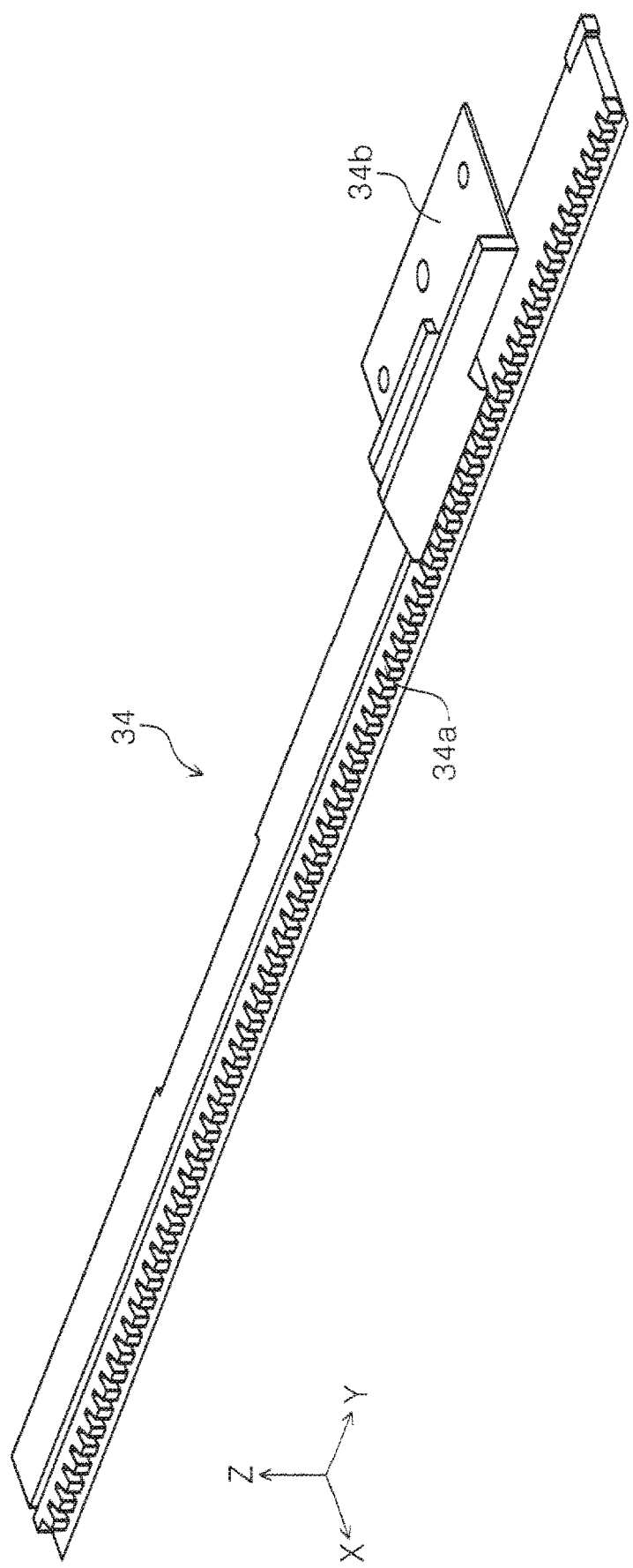
FIG. 13 is a perspective view of a rack forming section as viewed from the upper side.

A fourth rack 31c is formed in the Y-axis direction as illustrated in FIGS. 5 to 7, 9, and 10 in a side portion of the first tray 31 in the +X direction, and a third rack 34a is formed in the Y-axis direction as illustrated in FIGS. 6 and 13 in the rack forming section 34 that constitutes the displacement section 33.

As illustrated in FIG. 9, a pinion gear 37 is engaged with the fourth rack 31c formed in the first tray 31, and a pinion gear 38 is engaged with the third rack 34a formed in the rack forming section 34.

The power from the motor 41 is transmitted to the pinion gears 37 and 38 via a transmission gear group 40. The fourth rack 31c formed in the first tray 31 and the pinion gear 37 constitute a rack-and-pinion mechanism, and the third rack 34a formed in the rack forming section 34 and the pinion gear 38 constitute a rack-and-pinion mechanism. When the motor 41 rotates, the first tray 31 is displaced in the Y-axis direction and the rack forming section 34, that is, the displacement section 33, is also displaced in the Y-axis direction.

Note that the fourth rack 31c formed in the first tray 31 is constantly engaged with the pinion gear 37 and the third rack 34a formed in the rack forming section 34 is constantly engaged with the pinion gear 38 regardless of the state of the medium-receiving tray 30, and the engagement is not released. Therefore, it is possible to avoid abnormal noise generated when engagement in a rack-and-pinion mechanism is released and the engagement is made again. Additionally, even when the medium-receiving tray 30 is manually operated by the user, the rack-and-pinion mechanism is constantly active, and therefore, the medium-receiving tray 30 is able to be appropriately switched to the extended state or to the accommodated state.

Note that a friction clutch (not illustrated) is provided in the transmission gear group 40. A configuration is such that, even when the motor 41 further rotates in a state where the first tray 31 reaches a movement limit position in the Y-axis direction, the friction clutch runs idle, and similarly, even when the motor 41 further rotates in a state where the rack forming section 34 reaches a movement limit position in the Y-axis direction, the friction clutch runs idle. Accordingly, the rack-and-pinion mechanism is not damaged.

A regulating section (not illustrated) that controls the movement limit of the first tray 31 in the +Y direction and the −Y direction is provided in the frame (not illustrated) that supports the first tray 31, and a regulating section (not illustrated) that controls the movement limit of the rack forming section 34 in the +Y direction and the −Y direction is provided in the first tray 31.

The pinion gears 37 and 38 are formed to have the same number of teeth and rotate with the same rotational speed. When the motor 41 rotates while the medium-receiving tray 30 is in the accommodated state illustrated in FIG. 1, the medium-receiving tray 30 integrally moves in the +Y direction as indicated by the change from FIG. 1 to FIG. 2. Until the medium-receiving tray 30 is brought into the state illustrated in FIG. 2, a moving amount of the first tray 31 relative to a rotational amount of the motor 41 and a moving amount of the rack forming section 34, that is, the displacement section 33, relative to the rotational amount of the motor 41 are the same, and relative positions of the first tray 31 and the second tray 32 do not change.

In the first extended state illustrated in FIG. 2, the medium-receiving tray 30 is able to receive, for example, an A4-sized sheet having a longitudinal direction in the Y-axis direction.

In the state illustrated in FIG. 2, the first tray 31 reaches the movement limit position in the +Y direction. Thus, when the motor 41 further rotates in the state, the displacement section 33 and the second tray 32 move in the +Y direction while the first tray 31 stops, and the state is brought into the second extended state illustrated in FIG. 3.

In the second extended state illustrated in FIG. 3, the medium-receiving tray 30 is able to receive, for example, an A3-sized sheet having a longitudinal direction in the Y-axis direction.

Figure 14:
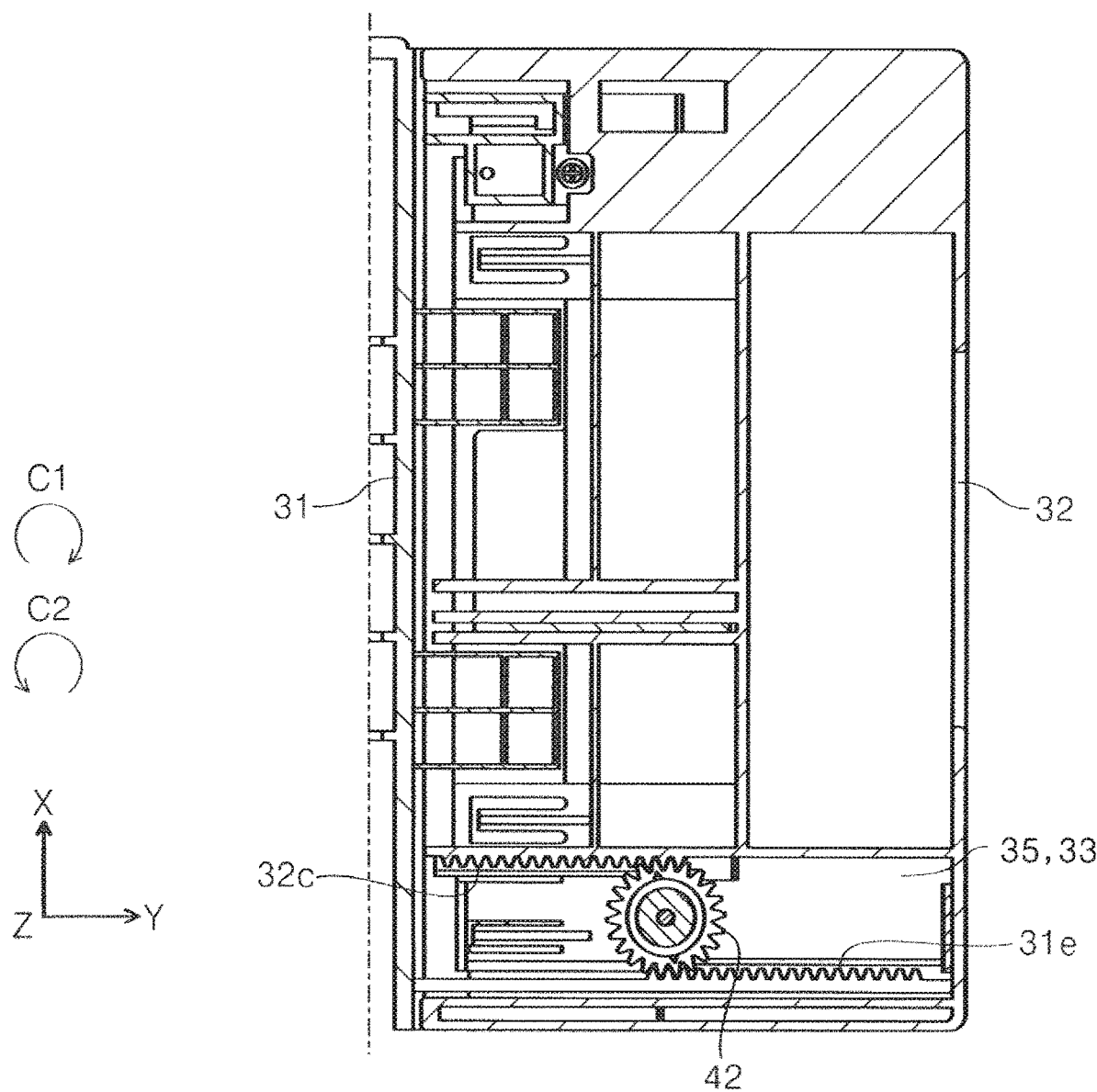
FIG. 14 is a sectional view of the medium-receiving tray taken along an X-Y plane.
Figure 15:
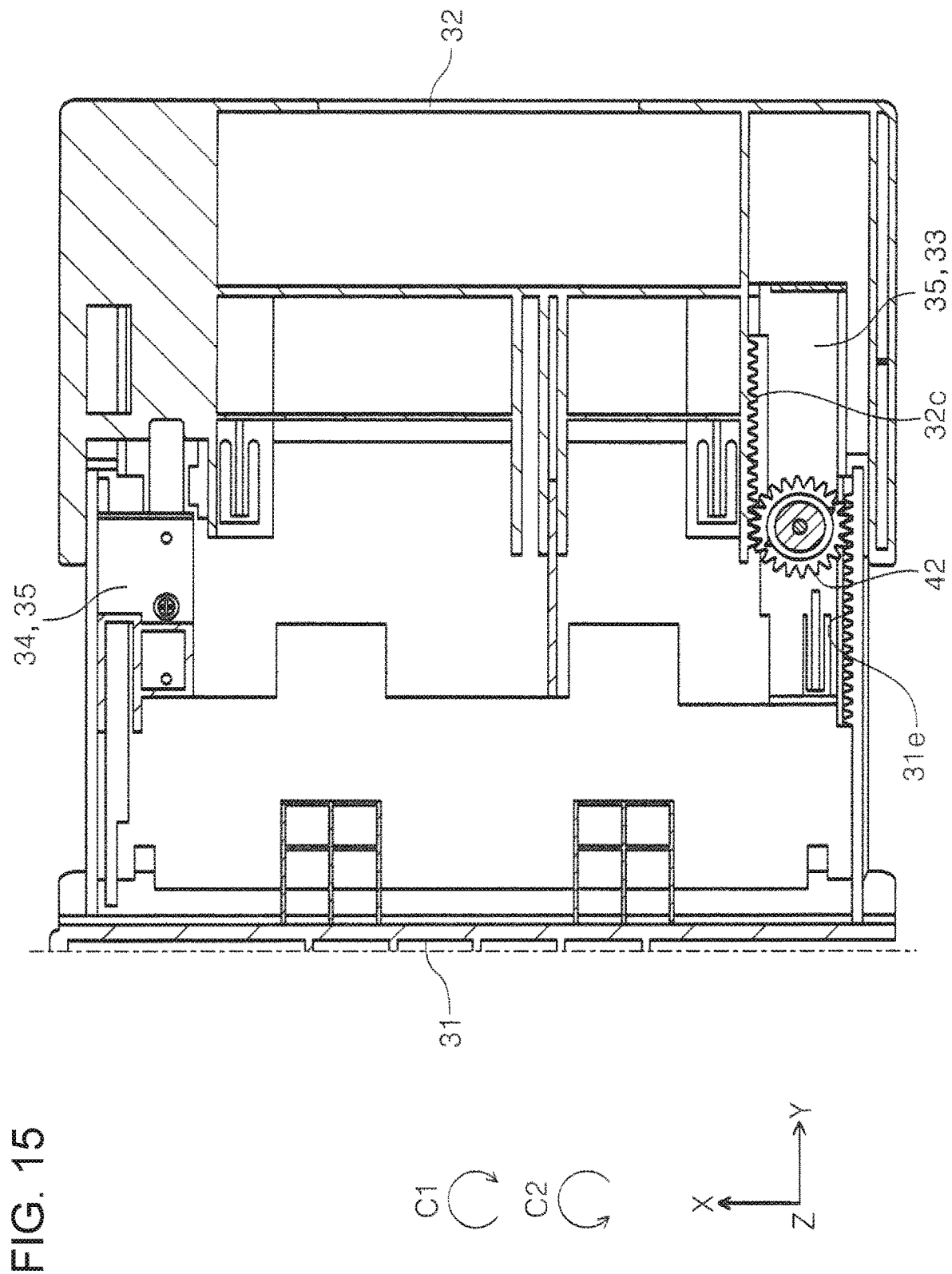
FIG. 15 is a sectional view of the medium-receiving tray taken along the X-Y plane.

Here, as illustrated in FIGS. 14 and 15, a first rack 31e is formed in the Y-axis direction in the first tray 31 and a second rack 32c is formed in the Y-axis direction in the second tray 32. A pinion gear 42 is rotatably supported by the gear support section 35 that constitutes the displacement section 33, and the pinion gear 42 is in a state of being engaged with both the first rack 31e and the second rack 32c.

FIG. 14 illustrates the first extended state illustrated in FIG. 2, and when the motor 41 rotates in the state, the displacement section 33, that is, the gear support section 35, moves in the +Y direction while the first tray 31 stops. At this time, since the pinion gear 42 rotates in direction C1 in FIGS. 14 and 15 by being engaged with the first rack 31e, the rotation is transmitted to the second rack 32c, and thus the second tray 32 moves in the +Y direction as indicated by the change from FIG. 14 to FIG. 15, and the state is switched to the second extended state.

As described above, a configuration is such that the pinion gear 42 is interposed between the first tray 31 and the second tray 32, the gear support section 35 (displacement section 33) that supports the pinion gear 42 is displaced in the Y-axis direction, the pinion gear 42 is thus displaced in the Y-axis direction, and rotation of the pinion gear 42 at this time causes the second tray 32 to be displaced. Accordingly, it is possible to increase a displacement amount of the second tray 32 compared to a displacement amount of the displacement section 35. Such a configuration makes it possible to shorten the time to switch the medium-receiving tray 30 from the accommodated state to the extended state or from the extended state to the accommodated state.

Further, the pinion gear 38 (refer to FIG. 9) is able to be provided close to the end of the medium-receiving tray 30 in the −Y direction. Therefore, it is also possible to contribute to a reduction in the dimension of the apparatus main body 2 in the Y-axis direction.

Note that, when the motor 41 rotates in reverse, the displacement section 33, that is, the gear support section 35, moves in the −Y direction and the pinion gear 42 rotates in direction C2 in FIGS. 14 and 15. Thereby, the second tray 32 moves in the −Y direction as indicated by the change from FIG. 15 to FIG. 14.

Figure 18:
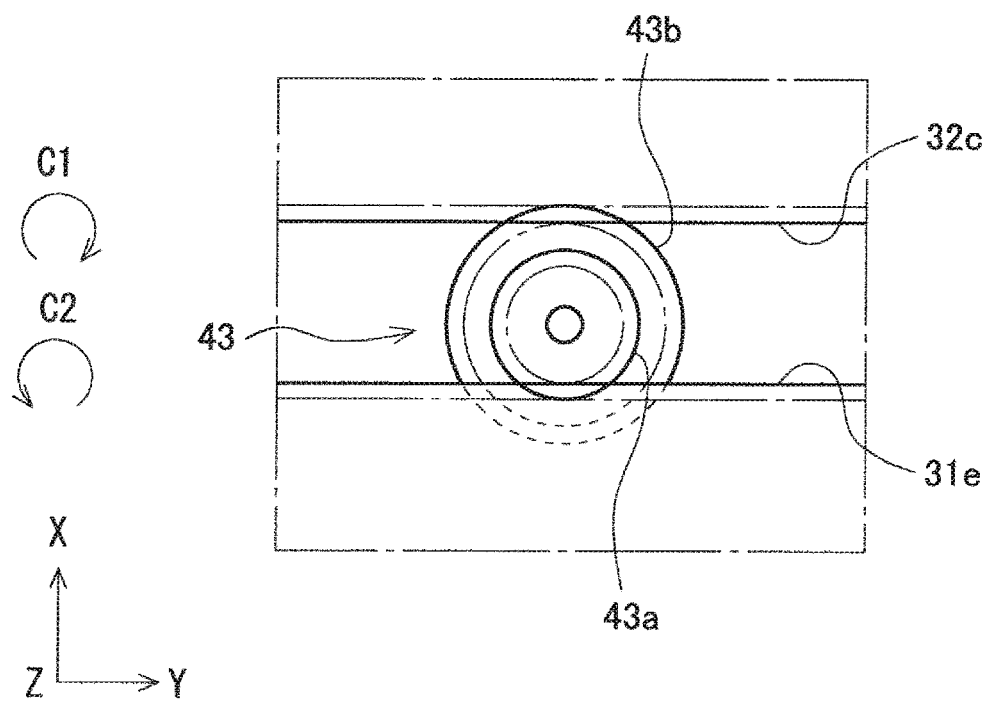
FIG. 18 illustrates another embodiment of a pinion gear interposed between the first tray and the second tray.

A compound gear 43 illustrated in FIG. 18 is also suitably used as the pinion gear 42 described above. The compound gear 43 is a compound gear which is a pinion gear and in which a first pinion gear section 43a engaged with the first rack 31e and a second pinion gear section 43b engaged with the second rack 32c are integrally formed. The second pinion gear section 43b is larger than the first pinion gear section 43a in diameter and number of teeth.

Such a configuration makes it possible to further increase a projecting amount of the second tray 32 relative to a rotational amount of the compound gear 43 that is the pinion gear. As a result, it is possible to further shorten the time to switch the medium-receiving tray 30 to the extended state.

Another feature of the medium-receiving tray 30 will be described below.

Figure 8:
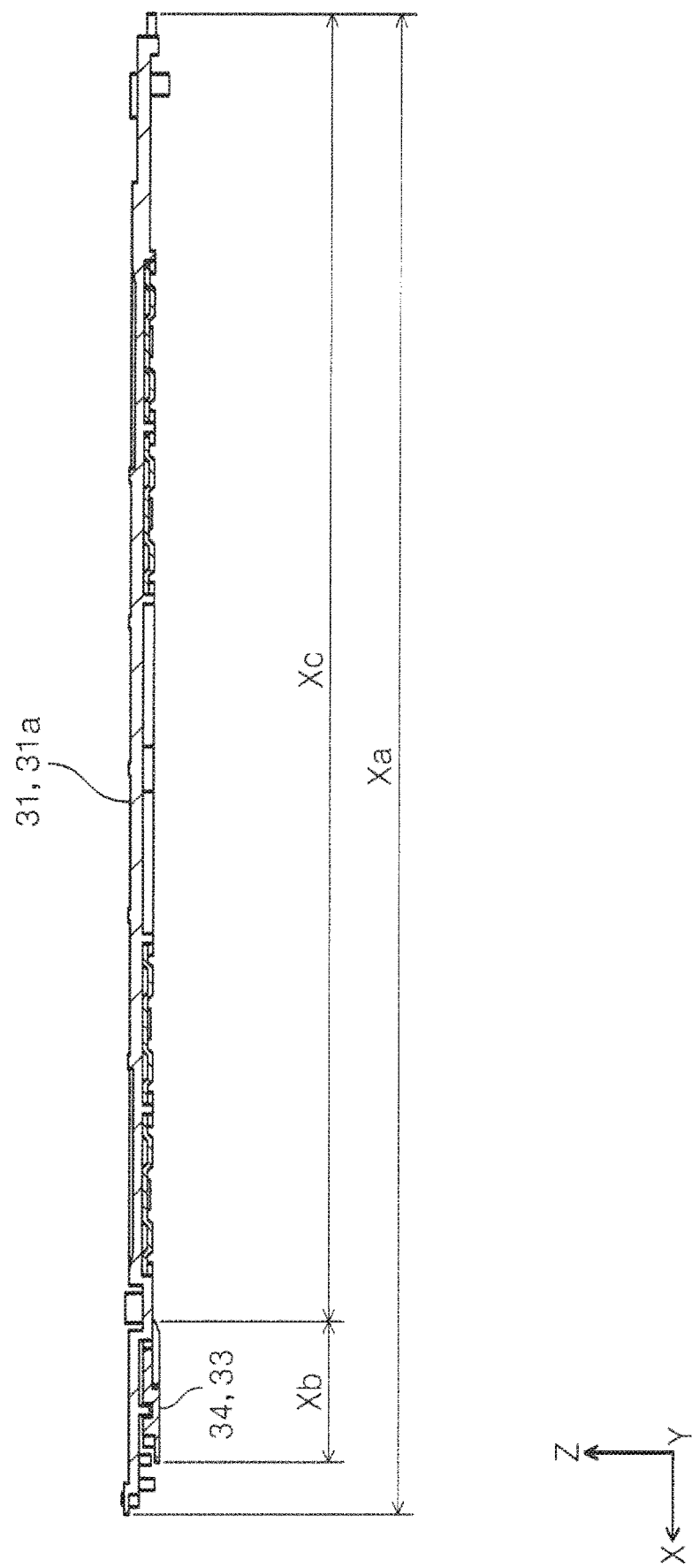
FIG. 8 is a sectional view taken along a line VIII-VIII in FIG. 6.

The displacement section 33 includes the rack forming section 34 in which the third rack 34a is formed in the Y-axis direction that is the displacement direction as illustrated in FIG. 7 and the gear support section 35 which is positioned further than the rack forming section 34 in the +Y direction that is the discharging direction of the recording sheet and which rotatably supports the pinion gear 42 (refer to FIGS. 14 and 15). The rack forming section 34 is provided closer to a side of the first tray 31 (in the +X direction) as illustrated in FIG. 8 in a width direction that is a direction intersecting the Y-axis direction, that is, in the X-axis direction. In FIG. 8, a range Xa is an occupancy region of the first tray 31 in the X-axis direction, a range Xb is an occupancy region of the rack forming section 34, and a range Xc is a region of the first tray 31 excluding the rack forming section 34. An increase in thickness of the medium-receiving tray 30 due to the thickness of the rack forming section 34 is able to be avoided in the range Xc, and accordingly a configuration that contributes to a reduction in the dimension of the apparatus main body 2 in the height direction is able to be provided.

Figure 5:
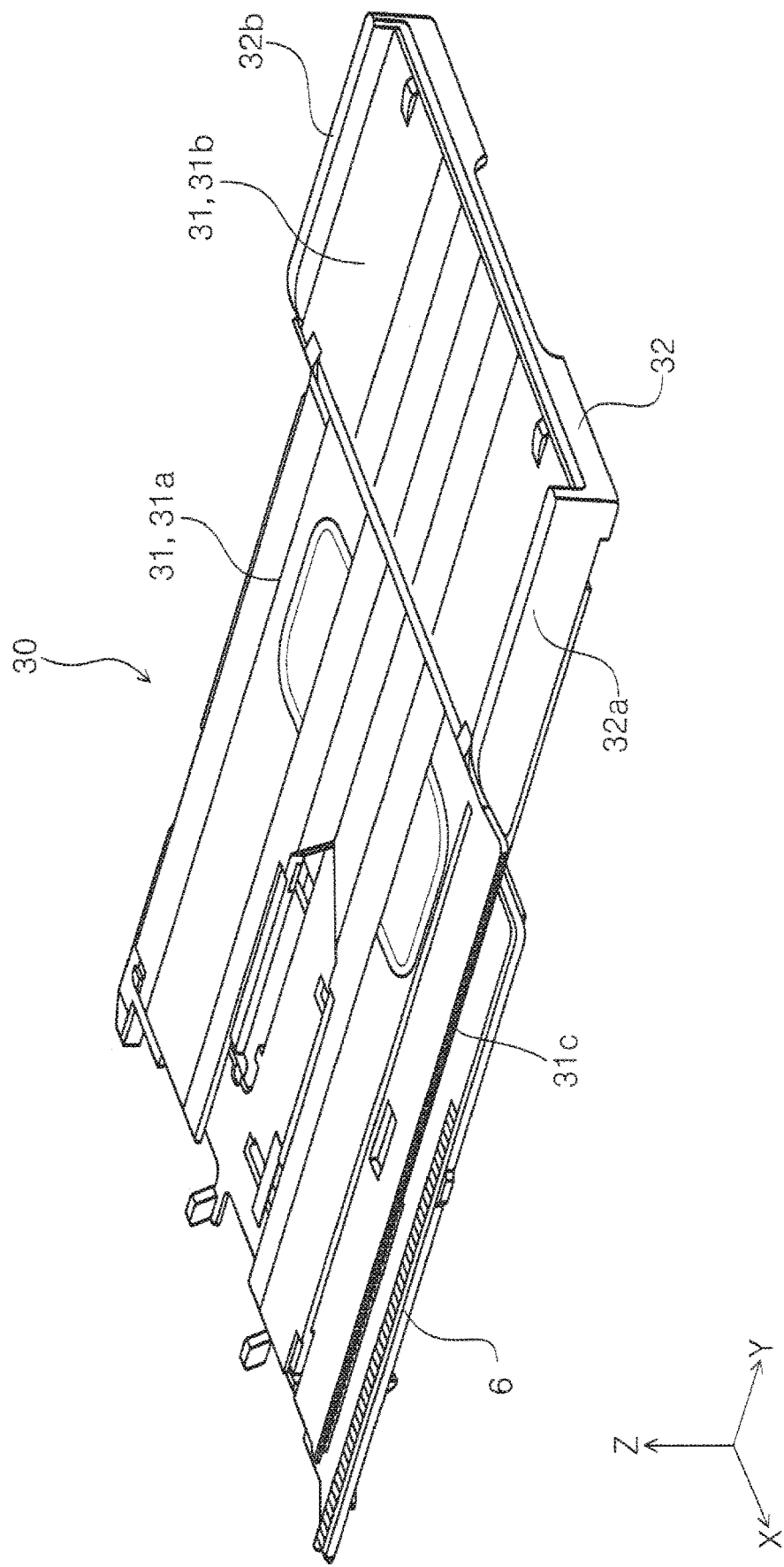
FIG. 5 is a perspective view of the medium-receiving tray in the accommodated state and an upper sheet feeding tray.

In particular, in the present embodiment, since the upper sheet feeding tray 6 is positioned below the first tray 31 as illustrated in FIG. 5, the dimension of the apparatus main body 2 in the height direction easily increases, but the thickness of the medium-receiving tray 30 is reduced as described above, and therefore, the dimension of the apparatus main body 2 in the height direction is reduced.

Figure 11:
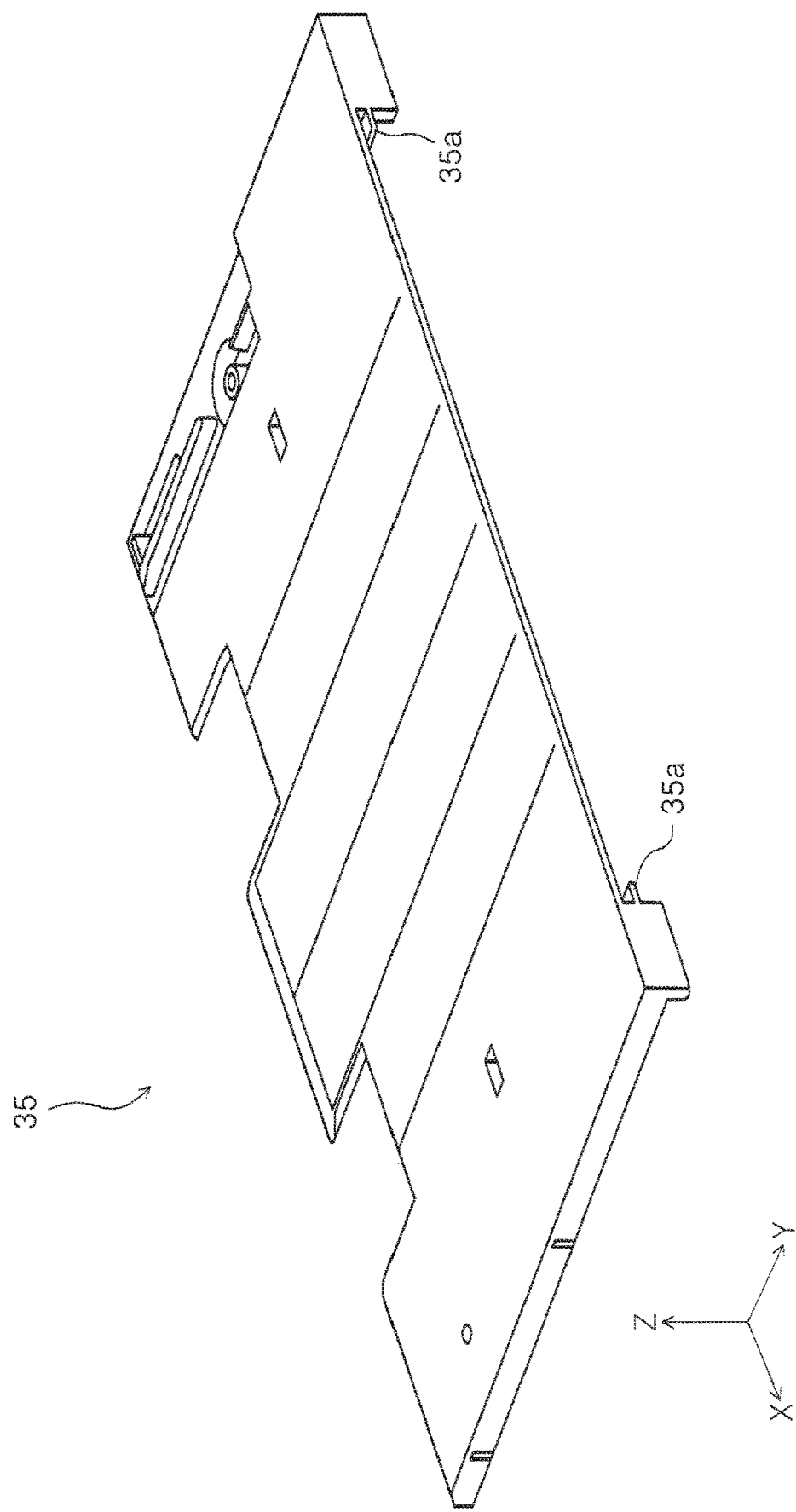
FIG. 11 is a perspective view of a gear support section as viewed from an upper side.

The gear support section 35 that constitutes the displacement section 33 is formed into a tray shape as illustrated in FIG. 11 and is in a state of being held between the first tray 31 and the second tray 32 as illustrated in FIGS. 6 and 7. This makes it possible to increase overall rigidity of the medium-receiving tray 30.

Note that a plurality of reinforcing members 36 that extend in the Y-axis direction as illustrated in FIGS. 7, 9, and 10 are provided in the X-axis direction below the first tray 31. The reinforcing members 36 may be formed of, for example, a metal plate, and thus the overall rigidity of the medium-receiving tray 30 is able to be increased.

In the present embodiment, since the second tray 32 and the displacement section 33 are configured to be supported by the first tray 31, the entirety of the medium-receiving tray 30 is able to be assembled as an assembly, thus facilitating an apparatus assembling operation.

As illustrated in FIGS. 5 to 7 and 10, the first tray 31 includes a first portion 31a and a second portion 31b that is positioned further than the first portion 31a from the apparatus main body 2 in the sheet discharging direction (+Y direction) and that is higher than the first portion 31a, and the second tray 32 and the gear support section 35 are arranged by using a space 31d under the second portion 31b as illustrated in FIG. 7. Such a configuration enables a reduction in the dimension of the medium-receiving tray 30 in the thickness direction (Z-axis direction).

Note that the second portion 31b is also usable as a support tray for manually supplying a medium that has a plate shape and high rigidity from a front side of the apparatus.

As described with reference to FIG. 9, in the medium-receiving tray 30, not only the second tray 32 but also the first tray 31 is displaced in response to receiving the power from the motor 41, and therefore, the second tray 32 is able to be projected further in the sheet discharging direction (+Y direction).

Figure 12:
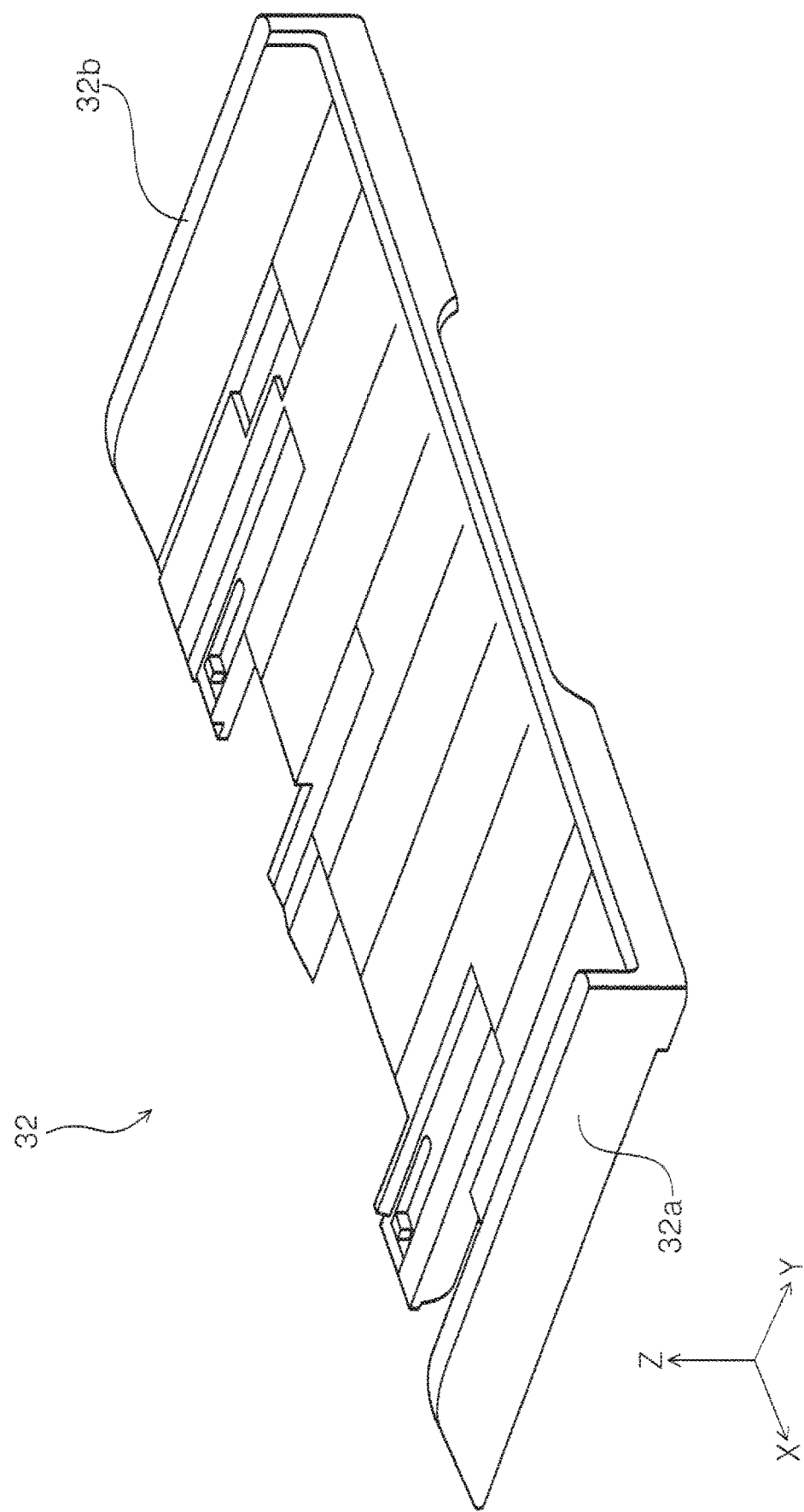
FIG. 12 is a perspective view of a second tray as viewed from the upper side.
Figure 16:
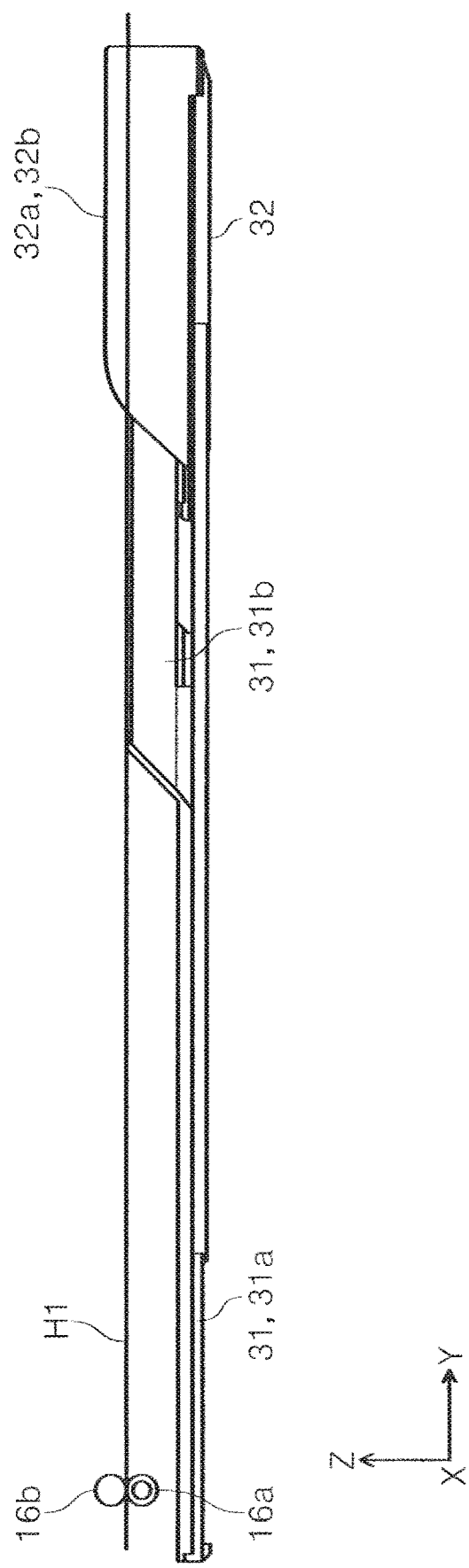
FIG. 16 is a side view of the medium-receiving tray.

As illustrated in FIG. 12, the second tray 32 includes a side wall portion 32a on one side in the X-axis direction and a side wall portion 32b on the other side. The side wall portions 32a and 32b are formed to be higher than a sheet nip position H1 formed between the discharge drive roller 16a and the discharge driven roller 16b as illustrated in FIG. 16. This makes it difficult for an upstream end (end in the −Y direction) of the discharged recording sheet to be lifted from the medium-receiving tray 30, and the chance of the next recording sheet to be discharged pushing out the recording sheet already discharged is able to be suppressed.

It is to be understood that the disclosure is not limited to the embodiment described above, that various modifications can be made within the scope of the disclosure described in the claims, and that these modifications are included within the scope of the disclosure.

What is claimed is:

1. A recording apparatus comprising:
an apparatus main body that includes a recording unit that performs recording on a medium;
a medium-receiving tray that is configured to be switched between a first state in which the medium-receiving tray is accommodated in the apparatus main body and a second state in which the medium-receiving tray is projected from a front surface of the apparatus main body and that receives the medium which is discharged; and
a motor that is a power source for switching a state of the medium-receiving tray, wherein
the medium-receiving tray includes
a first tray,
a second tray that is configured to be displaced with respect to the first tray and that is positioned further than the first tray from the apparatus main body when the medium-receiving tray is in the second state,
a pinion gear engaged with a first rack formed in the first tray in a displacement direction of the second tray and with a second rack formed in the second tray in the displacement direction, and
a displacement section that supports the pinion gear and that is displaced in the displacement direction in response to receiving power from the motor.

2. The recording apparatus according to claim 1, wherein the displacement section includes
a rack forming section in which a third rack is formed in the displacement direction, and
a gear support section that is positioned further than the rack forming section in a discharging direction of the medium and that supports the pinion gear, and
the rack forming section is provided close to a side of the first tray in a width direction that is a direction intersecting the displacement direction.

3. The recording apparatus according to claim 2, wherein the first tray includes
a first portion, and
a second portion that is positioned further than the first portion from the apparatus main body in the discharging direction of the medium and that is higher than the first portion, and
a portion of the second tray and the gear support section are configured to be arranged in a space under the second portion.

4. The recording apparatus according to claim 3, wherein the gear support section is formed into a tray shape and is held between the first tray and the second tray.

5. The recording apparatus according to claim 3, wherein the second tray and the displacement section are supported by the first tray.

6. The recording apparatus according to claim 3, wherein the first tray is displaced in the displacement direction in response to receiving the power from the motor.

7. The recording apparatus according to claim 3, wherein the pinion gear is a compound gear in which a first pinion gear section engaged with the first rack and a second pinion gear section engaged with the second rack are integrally formed, and
the second pinion gear section is larger than the first pinion gear section in diameter and number of teeth.

8. The recording apparatus according to claim 2, wherein the gear support section is formed into a tray shape and is held between the first tray and the second tray.

9. The recording apparatus according to claim 2, wherein the second tray and the displacement section are supported by the first tray.

10. The recording apparatus according to claim 2, wherein the first tray is displaced in the displacement direction in response to receiving the power from the motor.

11. The recording apparatus according to claim 2, wherein the pinion gear is a compound gear in which a first pinion gear section engaged with the first rack and a second pinion gear section engaged with the second rack are integrally formed, and
the second pinion gear section is larger than the first pinion gear section in diameter and number of teeth.

12. The recording apparatus according to claim 1, wherein the second tray and the displacement section are supported by the first tray.

13. The recording apparatus according to claim 1, wherein the first tray is displaced in the displacement direction in response to receiving the power from the motor.

14. The recording apparatus according to claim 1, wherein the pinion gear is a compound gear in which a first pinion gear section engaged with the first rack and a second pinion gear section engaged with the second rack are integrally formed, and
the second pinion gear section is larger than the first pinion gear section in diameter and number of teeth.

* * * * *